United States Patent
Liu et al.

(10) Patent No.: US 12,491,204 B2
(45) Date of Patent: Dec. 9, 2025

(54) USE OF OLEANOLIC ACID-28-O-BETA-D-GLUCOPYRANOSIDE IN PREPARATION OF ANTI-COLITIS DRUG

(71) Applicant: JILIN UNIVERSITY, Changchun (CN)

(72) Inventors: Jinping Liu, Changchun (CN); Caixia Wang, Changchun (CN); Fang Wang, Changchun (CN); Cuizhu Wang, Changchun (CN); Hongqiang Lin, Changchun (CN); Junzhe Wu, Changchun (CN); Zhuoqiao Li, Changchun (CN); Hanlin Liu, Changchun (CN); Haoming Lv, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 0 days.

(21) Appl. No.: 18/978,008

(22) Filed: Dec. 12, 2024

(65) Prior Publication Data

US 2025/0186471 A1    Jun. 12, 2025

(30) Foreign Application Priority Data

Dec. 12, 2023  (CN) .......................... 202311695482.2

(51) Int. Cl.
  *A61K 31/704*  (2006.01)
  *A61P 1/04*  (2006.01)
  *A61P 29/00*  (2006.01)

(52) U.S. Cl.
  CPC .............. *A61K 31/704* (2013.01); *A61P 1/04* (2018.01); *A61P 29/00* (2018.01)

(58) Field of Classification Search
  None
  See application file for complete search history.

(56) References Cited

FOREIGN PATENT DOCUMENTS

| CN | 103233055 A | 8/2013 | |
| CN | 112110978 A | 12/2020 | |
| CN | 114392264 A | * 4/2022 | ......... A61K 31/7024 |
| CN | 115477681 A | 12/2022 | |

OTHER PUBLICATIONS

Yu, W., Li, Z., Long, F., Chen, W., Geng, Y., Xie, Z., . . . & Liu, T. (2017). A systems pharmacology approach to determine active compounds and action mechanisms of Xipayi KuiJie'an enema for treatment of ulcerative colitis. Scientific Reports, 7(1), 1189. (Year: 2017).*

Ai, Z., Liu, S., Zhang, J., Hu, Y., Tang, P., Cui, L., . . . & Wang, Y. (2024). Ginseng Glucosyl Oleanolate from Ginsenoside Ro, Exhibited Anti-Liver Cancer Activities via MAPKs and Gut Microbiota In Vitro/Vivo. Journal of Agricultural and Food Chemistry, 72(14), 7845-7860. (Year: 2024).*

Ok-Hwa Kang, et al., Anti-inflammatory effect of oleanoic acid 28-O-β-D-glycopyranosyl ester isolated from Aralia cordata in activated HMC-1 cells, African Journal of Pharmacy and Pharmacology, 2012, pp. 3206-3214, vol. 6, No. 46.

* cited by examiner

*Primary Examiner* — Dale R Miller

(74) *Attorney, Agent, or Firm* — Bayramoglu Law Offices LLC

(57) ABSTRACT

A use of oleanolic acid-28-O-β-D-glucopyranoside in the preparation of an anti-colitis drug is provided. The oleanolic acid-28-O-β-D-glucopyranoside has significant anti-ulcerative-colitis activity compared with parent nucleus oleanolic acid and other analogues, and has equivalent efficacy compared with Mesalazine, a first-line drug for the clinical treatment of inflammatory bowel disease, and can also avoid salicylic acid anaphylaxis possibly caused by Mesalazine western medicine treatment, thereby achieving a good application prospect.

7 Claims, 14 Drawing Sheets

USE OF OLEANOLIC ACID-28-O-BETA-D-GLUCOPYRANOSIDE IN PREPARATION OF ANTI-COLITIS DRUG

CROSS REFERENCE TO THE RELATED APPLICATIONS

This application is based upon and claims priority to Chinese Patent Application No. 202311695482.2, filed on Dec. 12, 2023, the entire contents of which are incorporated herein by reference.

TECHNICAL FIELD

The present invention belongs to the field of traditional Chinese medicines for treating ulcerative colitis, and particularly relates to use of oleanolic acid-28-O-β-D-glucopyranoside in the preparation of an anti-colitis drug.

BACKGROUND

Colitis refers to inflammatory lesions in the colon caused by various factors. It can be caused by bacteria, fungi, viruses, parasites, protozoa, etc., or by allergic reactions and physiochemical factors. Depending on different causes, the colitis can be classified into specific inflammatory lesions including infectious colitis, ischemic colitis, and pseudomembranous colitis, and non-specific inflammatory lesions including ulcerative colitis and Crohn's disease of the colon. The main clinical manifestations are diarrhea, abdominal pain, mucous stool and bloody purulent stool, tenesmus, even severe constipation, and failure to excrete within several days, often accompanied by symptoms of weakness and fatigue, and recurrent attacks.

The pathogenic factors of ulcerative colitis (UC) have not yet been fully elucidated, but it is currently believed that this disease occurs as a result of the combined effects of immune factors, genetic factors, environmental factors, and infection factors. The current drug therapies for UC treatment include aminosalicylates drugs (such as Mesalazine), glucocorticoid, and immunosuppressive reagents, but none of these therapies can help patients get rid of the pain and severe side effects associated with long-term drug use.

Oleanolic acid (OA), also known as Qingsisu, belongs to the family of pentacyclic triterpenoid compounds. It is an effective ingredient isolated from plants such as *Fructus ligustri Lucidi*, *Swertia leducii*. The OA is widely present in various plants in the form of free bodies or glycosides, and has diverse biological activities and pharmacological effects, such as liver protection, blood sugar and cholesterol lowering, anti-tumor, anti-hypertension, anti-inflammation, and anti-HIV.

Oleanolic acid-28-O-β-D-glucopyranoside (28-OA-β-G) has a structural formula as follows.

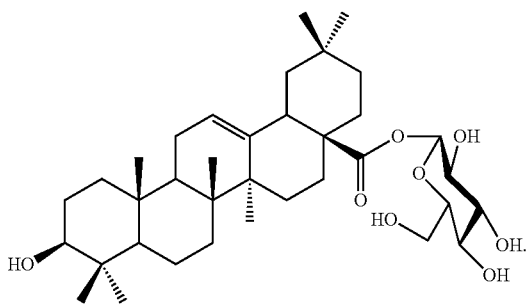

The Chinese invention patent application CN103233055A discloses a method for preparing oleanolic acid-28-O-β-D-glucopyranoside, wherein the oleanolic acid-28-O-β-D-glucopyranoside is obtained by biotransformation of oleanolic acid using a strain having a preservation number of NRRL1086. This invention also proves its anti-inflammatory use through mouse ear/paw edema experiments.

The Chinese invention patent application CN115477681A discloses a pentacyclic triterpenoid saponin derivative and its preparation method and application, wherein the derivative is prepared by taking a compound A3 as a raw material and using an esterification or amidation reaction for a carboxyl group of C-28, and a drug with anti-inflammatory, antioxidant, and anti-apoptosis effects is prepared by taking this derivative as an active ingredient. The pentacyclic triterpenoid saponin derivative published for the first time in this invention did not show obvious cytotoxicity to macrophages, but could increase an IκB protein level in an NF-κB signaling pathway, and compared with the existing positive drugs, had a significant increase in the IκB protein level ($p<0.05$), as well as significant decrease in the release of IL-6 and TNF-α. These results suggested that this derivative had better anti-inflammatory activity, and could alleviate the symptoms of colitis in mice. Although 28-OA-β-G also belongs to the pentacyclic triterpenoid saponin derivative, its structure is not similar to the chemical structure mentioned in this invention, and there have been no studies reported so far on whether 28-OA-β-G has an anti-ulcerative-colitis effect.

SUMMARY

In view of the deficiencies in the prior art, the present invention provides use of oleanolic acid-28-O-β-D-glucopyranoside in the preparation of anti-ulcerative-colitis drugs.

In order to achieve the objects of the present invention, the following technical solution is adopted:

Use of oleanolic acid-28-O-β-D-glucopyranoside in the preparation of an anti-ulcerative-colitis drug.

Preferably, the use is use of the oleanolic acid-28-O-β-D-glucopyranoside in the preparation of a drug for reducing the level of TNF-α in the serum and/or colon of the body.

Preferably, the use is use of the oleanolic acid-28-O-β-D-glucopyranoside in the preparation of a drug for t reducing the level of IL-6 in the serum and/or colon of the body.

Preferably, the use is use of the oleanolic acid-28-O-β-D-glucopyranoside in the preparation of a drug for reducing the level of iNOS in the serum and/or colon of the body.

Preferably, the use is use of the oleanolic acid-28-O-β-D-glucopyranoside in the preparation of a drug for reducing the level of MPO and/or MDA in the colon of the body.

Preferably, the use is use of the oleanolic acid-28-O-β-D-glucopyranoside in the preparation of a drug for improving the level of SOD in the colon of the body.

Preferably, the use is use of the oleanolic acid-28-O-β-D-glucopyranoside in the preparation of a drug for increasing a colon length.

Preferably, the use is use of the oleanolic acid-28-O-β-D-glucopyranoside in the preparation of a drug for reducing the intestinal permeability.

Preferably, the use is use of the oleanolic acid-28-O-β-D-glucopyranoside in the preparation of a drug for reducing the disease activity index and/or spleen coefficient of the body.

Compared with the prior art, the present invention has the following technical effects.

(1) The present invention uses dextran sulfate sodium (DSS) to induce colitis. The induction of colitis by dextran sulfate sodium (DSS) is a commonly used experimental model of ulcerative colitis, in which DSS will cause intestinal retention, disruption of the mucosal barrier, and infiltration of inflammatory cells, promoting the progress of colitis. This study found that oleanolic acid-28-O-β-D-glucopyranoside has significant anti-ulcerative-colitis activity compared with parent nucleus oleanolic acid and other analogues (e.g., 3-bit sugar connected oleanolic acid, and 3-bit and 28-bit sugar connected oleanolic acid).

(2) The present invention found that oleanolic acid-28-O-β-D-glucopyranoside has equivalent efficacy with Mesalazine. Mesalazine, also known as 5-aminosalicylic acid (5-ASA), is a first-line drug for treating inflammatory bowel diseases such as ulcerative colitis (UC).

(3) The present invention has further studied the in vivo anti-ulcerative-colitis activity of the oleanolic acid-28-O-β-D-glucopyranoside, and explored its pharmacological effects through indicators such as DAI, HE section, transmission electron microscope, Elisa kits (TNF-α, iNOS, IL-6, MPO, MDA, and SOD). The results show that the oleanolic acid-28-O-β-D-glucopyranoside can significantly reduce the levels of TNF-α, IL-6, iNOS, MPO, and MDA in the serum and/or colon of the body of the ulcerative colitis patients, and can also increase the SOD level, reduce the disease activity index and spleen coefficient of the body, increase the colon length, and reduce the intestinal permeability.

Figure 1:
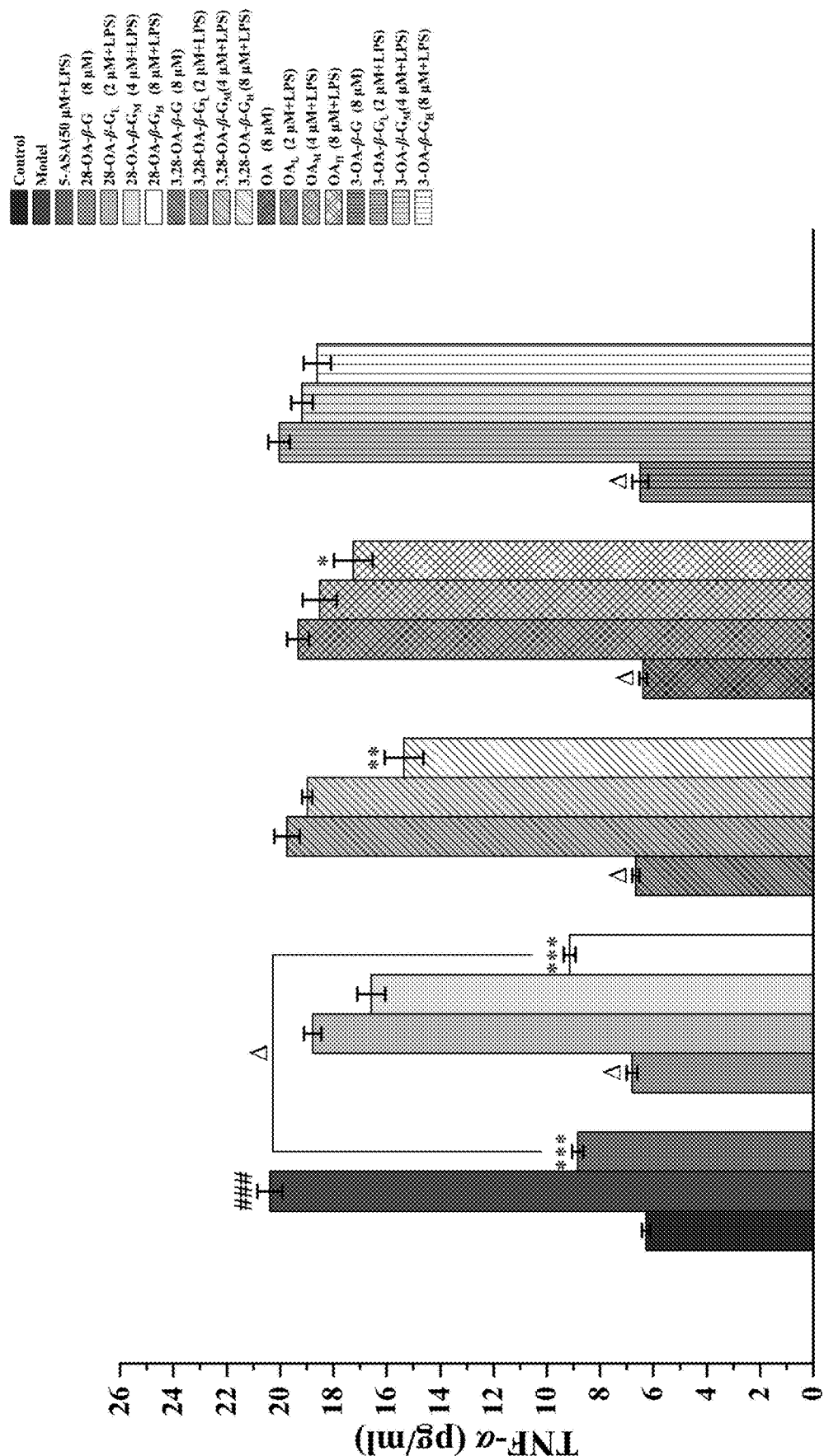
FIG. 1 shows the effects of oleanolic acid-28-O-β-D-glucopyranoside, oleanolic acid-3,28-O-β-D-glucopyranoside, oleanolic acid, and oleanolic acid-3-O-β-D-glucopyranoside on a TNF-α level in a Caco-2 cell model, wherein on a horizontal axis, the groups, from left to right, are a control group; a model group; a 5-ASA group; oleanolic acid-28-O-β-D-glucopyranoside single-administration, low-dose, medium-dose and high-dose groups; oleanolic acid-3,28-O-β-D-glucopyranoside single-administration, low-dose, medium-dose and high-dose groups; oleanolic acid single-administration, low-dose, medium-dose and high-dose groups; and oleanolic acid-3-O-β-D-glucopyranoside single-administration, low-dose, medium-dose and high-dose groups in sequence.

In the above figures, #indicates a significant statistical difference compared to the control group, #$P<0.05$, ##$P<0.01$, ###$P<0.001$; * indicates a significant statistical difference compared to the model group, *$P<0.05$,

P<0.01, *P<0.001; △ indicates no significant statistical difference between the 5-ASA group and the oleanolic acid-28-O-β-D-glucopyranoside high-dose group.

The unclear parts in the above figures do not affect the understanding of those skilled in the art to the technical solutions of the present invention.

DETAILED DESCRIPTION OF THE EMBODIMENTS

The present invention will be further described below in conjunction with the specific embodiments.

A preparation method of oleanolic acid-28-O-β-D-glucopyranoside (28-OA-β-G) includes the following steps: synthesizing a bromo-glycosyl donor by taking α-D-glucopyranose as a raw material; and reacting the bromo-glycosyl donor with oleanolic acid to obtain oleanolic acid-28-O-β-D-glucopyranoside (28-OA-β-G).

A preparation method of oleanolic acid-3,28-O-β-D-glucopyranoside (3,28-OA-β-G) includes the following steps: synthesizing a bromo-glycosyl donor and a trichloroacetimidate-glycosyl donor by taking α-D-glucopyranose as a raw material; and reacting the bromo-glycosyl donor and the trichloroacetimidate-glycosyl donor successively with oleanolic acid to obtain oleanolic acid-3,28-O-β-D-glucopyranoside (3,28-OA-β-G).

A preparation method of oleanolic acid-3-O-β-D-glucopyranoside (3-OA-β-G) includes the following steps: synthesizing a trichloroacetimidate-glycosyl donor by taking α-D-glucopyranose as a raw material; synthesizing a glycosyl receptor by taking oleanolic acid as a raw material; and reacting the trichloroacetimidate-glycosyl donor with a glycosyl receptor to obtain oleanolic acid-3-O-β-D-glucopyranoside (3-OA-β-G).

The supplier of oleanolic acid (OA) is Shanghai Shaoyuan Reagent Co., Ltd., batch number: R21110011.

The supplier of Mesalazine (5-ASA) is Sunflower Pharmaceutical Group Co., Ltd., Jiamusi Luoling Pharmaceutical Co., Ltd., batch number: 220612.

Example 1 In-Vitro Experiments of Oleanolic Acid-28-O-β-D-Glucopyranoside Against Ulcerative Colitis

1. Experimental Reagents

Main experimental reagents were shown in Table 1.

TABLE 1

| Main experimental reagents | |
|---|---|
| Name | Manufacturer |
| MEM medium | Shanghai Zhongqiao Xinzhou Biological Technology Co., Ltd. |
| Lipopolysaccharide (LPS) | American Sigma |
| Phosphate buffer solution (PBS) | Beijing Lanjie Ke Technology Co., Ltd. |
| Transwell chamber | Thermo Fisher Scientific, USA |
| IL-6, iNOS, and TNF-α ELISA kits | Hangzhou Multisciences (Lianke) Biotech, Co., Ltd. |
| E-cadherin, Claudin-1, ZO-1, and Occludin antibodies | Proteintech Group, Inc Wuhan Pricella Biotechnology Co., Ltd. |
| Human colorectal adenocarcinoma cells (Caco-2 cells) | |

2. Experimental Method (1) Determination of Transmembrane Epithelial Resistance and Inflammatory Factors in Caco-2 Cells The Caco-2 cells were inoculated at a density of $1 \times 10^5$ cells/ml (400 μl per well) into a Transwell chamber and cultured under 5% $CO_2$ and 37° C. After Day 21, a medium was replaced with a basal MEM medium. With 1 μg/ml LPS as an inflammatory model inducer of Caco-2 cells, the cells were divided into 19 groups: a control group, a model group (LPS 1 μg/ml), a 5-ASA group (LPS 1 μg/ml+5-ASA 50 μM), an LPS+28-OA-β-$G_L$ group (LPS 1 μg/ml+28-OA-β-G 2 μM), an LPS+28-OA-β-$G_M$ group (LPS 1 μg/ml+28-OA-β-G 4 μM), an LPS+28-OA-β-$G_H$ group (LPS 1 μg/ml+28-OA-β-G 8 μM), a 28-OA-β-G group (28-OA-β-G 8 μM), an LPS+3,28-OA-β-$G_L$ group (LPS 1 μg/ml+3,28-OA-β-G 2 μM), an LPS+3,28-OA-β-$G_M$ group (LPS 1 μg/ml+3,28-OA-β-G 4 μM), an LPS+3,28-OA-β-$G_H$ group (LPS 1 μg/ml+3,28-OA-β-G 8 μM), a 3,28-OA-β-G group (3,28-OA-β-G 8 μM), an LPS+$OA_L$ group (LPS 1 μg/ml+OA 2 μM), an LPS+$OA_M$ group (LPS 1 μg/ml+OA 4 μM), an LPS+$OA_H$ group (LPS 1 μg/ml+OA 8 μM), an OA group (OA 8 μM), an LPS+3-OA-β-$G_L$ group (LPS 1 μg/ml+3-OA-β-G 2 μM), an LPS+3-OA-β-$G_M$ group (LPS 1 μg/ml+3-OA-β-G 4 μM), an LPS+3-OA-β-$G_H$ group (LPS 1 μg/ml+3-OA-β-G 8 μM), and a 3-OA-β-G group (28-OA-β-G 8 μM). The control group was added with a MEM medium, while the other groups were added with the corresponding doses of LPS and compounds with the MEN medium as a solvent, and incubated in a 5% $CO_2$, 37° C. constant-temperature incubator for 24 hours. Resistance values were measured using a transmembrane resistance meter. TEER value=(measured resistance value−control resistance value)×Transwell chamber area, expressed in $Ω·cm^2$. A cell supernatant sample was taken, and an ELISA kit was used to determine the contents of TNF-α, IL-6, and iNOS in the serum.

(2) Determination of Expression Level of Tight Junction Proteins in Caco-2 Cells Caco-2 cells ($1 \times 10^5$ cells/ml) were inoculated onto a cell climbing slice in a 24-well plate (with 600 μl of cells per well), and reached confluence within 2 days. The cells were divided into 7 groups: a control group, a model group (LPS 1 μg/ml), a 5-ASA group (LPS 1 μg/ml+5-ASA 50 μM), an LPS+28-OA-β-$G_L$ group (LPS 1 μg/ml+28-OA-β-G 2 μM), an LPS+28-OA-β-$G_M$ group (LPS 1 μg/ml+28-OA-β-G 4 μM), an LPS+28-OA-β-$G_H$ group (LPS 1 μg/ml+28-OA-β-G 8 μM), and a 28-OA-β-G group (28-OA-β-G 8 μM). The control group was added with a MEM medium, while the other groups were added with the corresponding doses of LPS and 28-OA-β-G with the MEN medium as a solvent, and incubated in a 5% $CO_2$, 37° C. constant-temperature incubator for 24 hours. Immunofluorescence imaging was performed after a series of treatments.

3. Result Analysis

Figure 2:
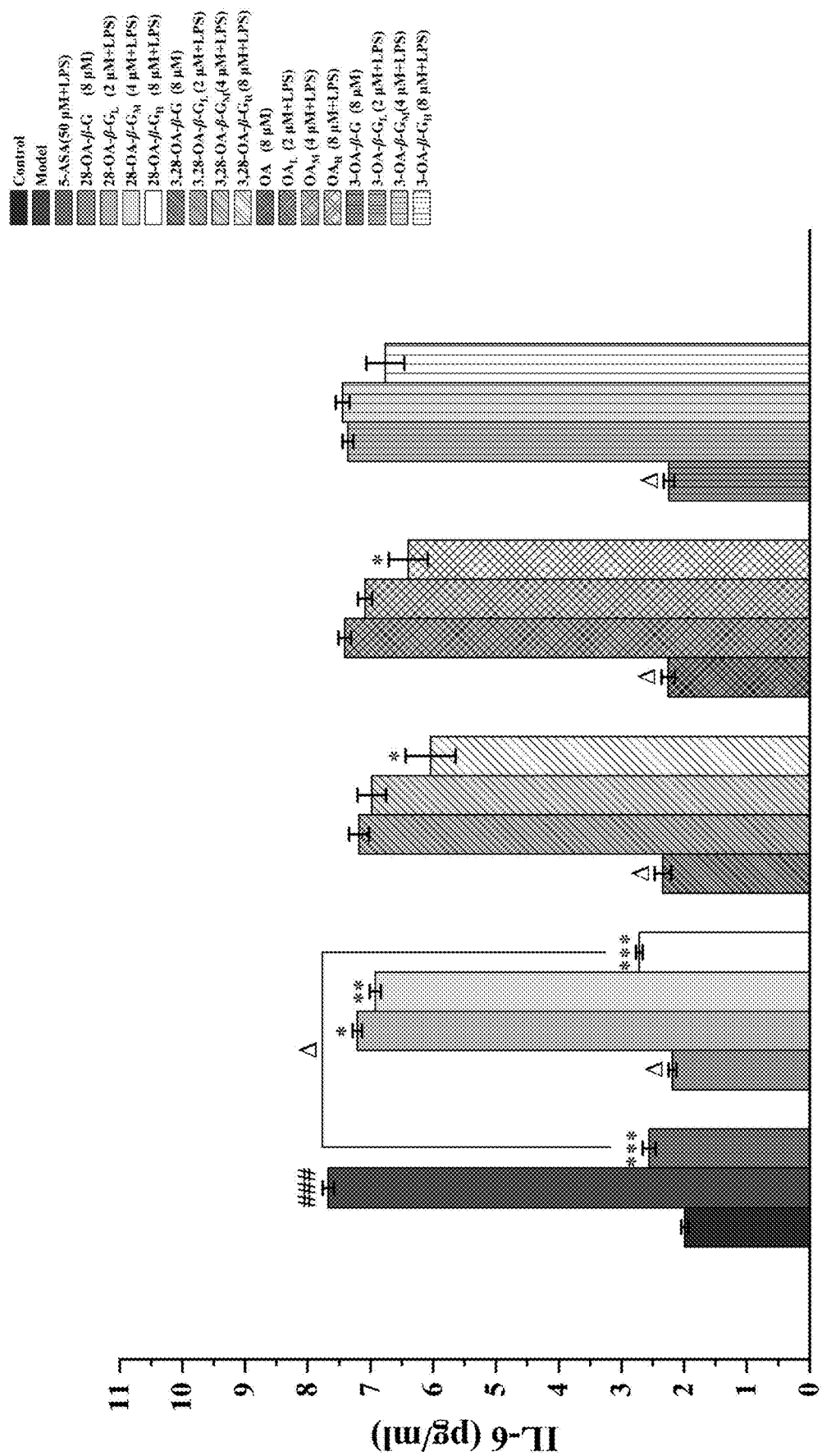
FIG. 2 shows the effects of oleanolic acid-28-O-β-D-glucopyranoside, oleanolic acid-3,28-O-β-D-glucopyranoside, oleanolic acid, and oleanolic acid-3-O-β-D-glucopyranoside on an IL-6 level in the Caco-2 cell model, wherein on a horizontal axis, the groups, from left to right, are a control group; a model group; a 5-ASA group; oleanolic acid-28-O-β-D-glucopyranoside single-administration, low-dose, medium-dose and high-dose groups; oleanolic acid-3,28-O-β-D-glucopyranoside single-administration, low-dose, medium-dose and high-dose groups; oleanolic acid single-administration, low-dose, medium-dose and high-dose groups; and oleanolic acid-3-O-β-D-glucopyranoside single-administration, low-dose, medium-dose and high-dose groups in sequence.
Figure 3:
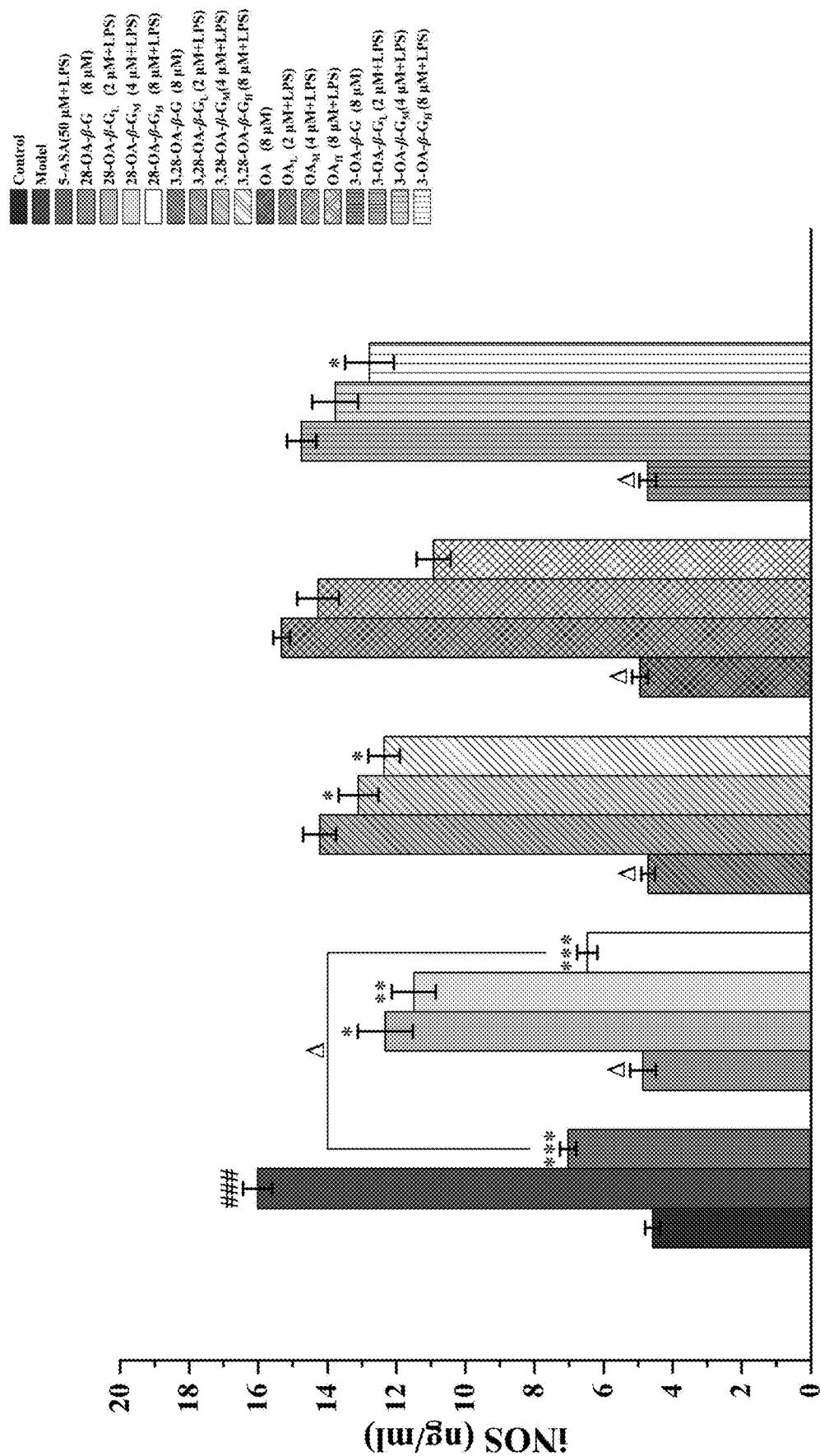
FIG. 3 shows the effects of oleanolic acid-28-O-β-D-glucopyranoside, oleanolic acid-3,28-O-β-D-glucopyranoside, oleanolic acid, and oleanolic acid-3-O-β-D-glucopyranoside on an iNOS level in the Caco-2 cell model, wherein on a horizontal axis, the groups, from left to right, are a control group; a model group; a 5-ASA group; oleanolic acid-28-O-β-D-glucopyranoside single-administration, low-dose, medium-dose and high-dose groups; oleanolic acid-3,28-O-β-D-glucopyranoside single-administration, low-dose, medium-dose and high-dose groups; oleanolic acid single-administration, low-dose, medium-dose and high-dose groups; and oleanolic acid-3-O-β-D-glucopyranoside single-administration, low-dose, medium-dose and high-dose groups in sequence.

Inflammatory factors: the results were shown in FIG. 1 to FIG. 3. Compared with the control group, the model group showed a sufficient increase in the levels of three inflammatory factors, TNF-α, IL-6, and iNOS, indicating that an inflammation model was successfully established. Compared with the model group, the administration group showed a reduction in the expression of three inflammatory factors at different doses, wherein 28-OA-β-G showed the best anti-inflammatory activity among the high-dose administration groups.

Figure 4:
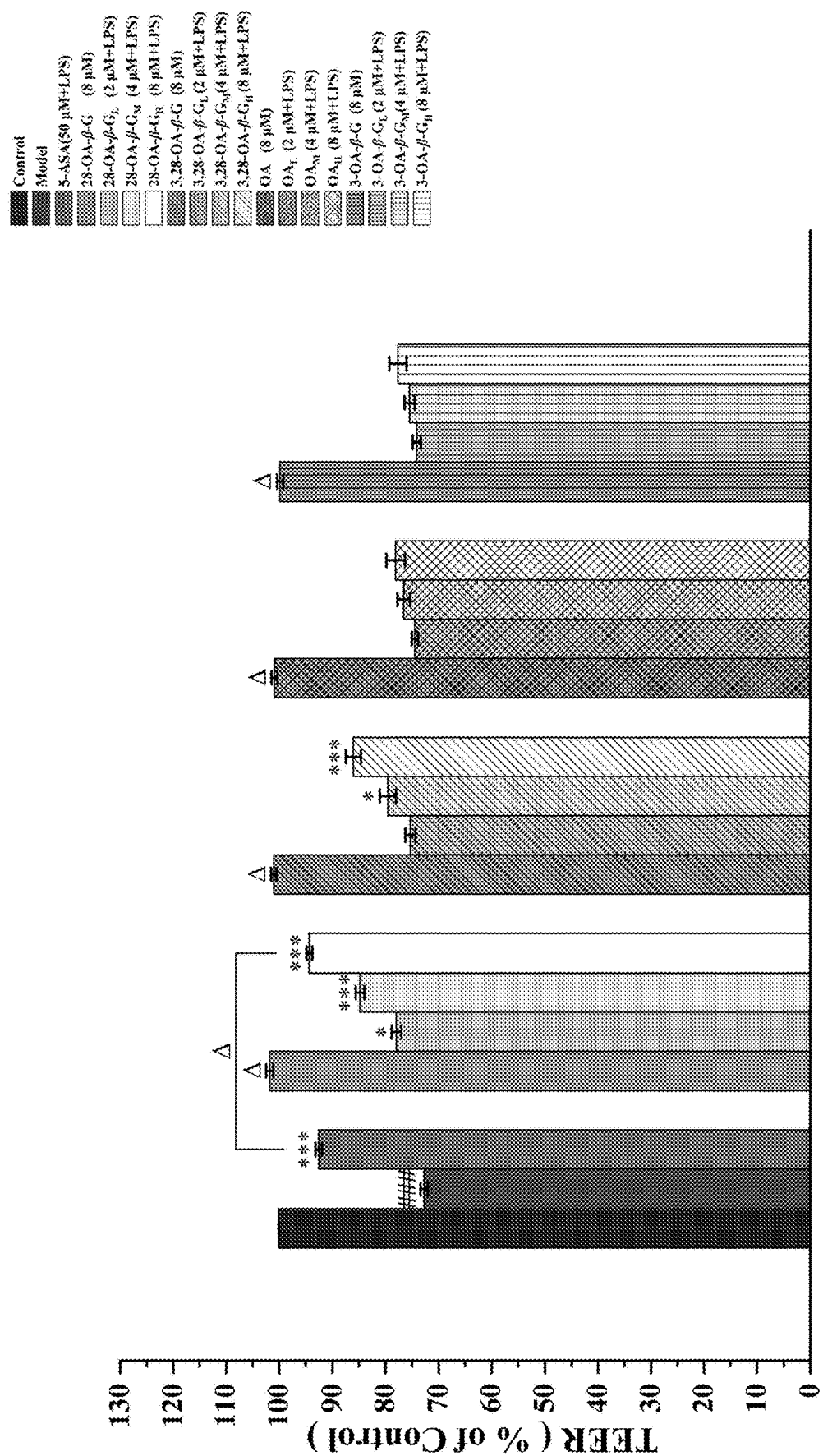
FIG. 4 shows the effects of oleanolic acid-28-O-β-D-glucopyranoside, oleanolic acid-3,28-O-β-D-glucopyranoside, oleanolic acid, and oleanolic acid-3-O-β-D-glucopyranoside on a TEER value in the Caco-2 cell model, wherein on a horizontal axis, the groups, from left to right, are a control group; a model group; a 5-ASA group; oleanolic acid-28-O-β-D-glucopyranoside single-administration, low-dose, medium-dose and high-dose groups; oleanolic acid-3,28-O-β-D-glucopyranoside single-administration, low-dose, medium-dose and high-dose groups; oleanolic acid single-administration, low-dose, medium-dose and high-dose groups; and oleanolic acid-3-O-β-D-glucopyranoside single-administration, low-dose, medium-dose and high-dose groups in sequence.

TEER value: the results were shown in FIG. 4, where the TEER value of the Caco-2 cells decreased significantly after LPS treatment, indicating that LPS could induce damage to the barrier of Caco-2 cells. After intervention with 28-OA- β-G (8 μM), the TEER value significantly increased, suggesting that 28-OA-β-G could improve the barrier function of the Caco-2 cells.

Figure 5:
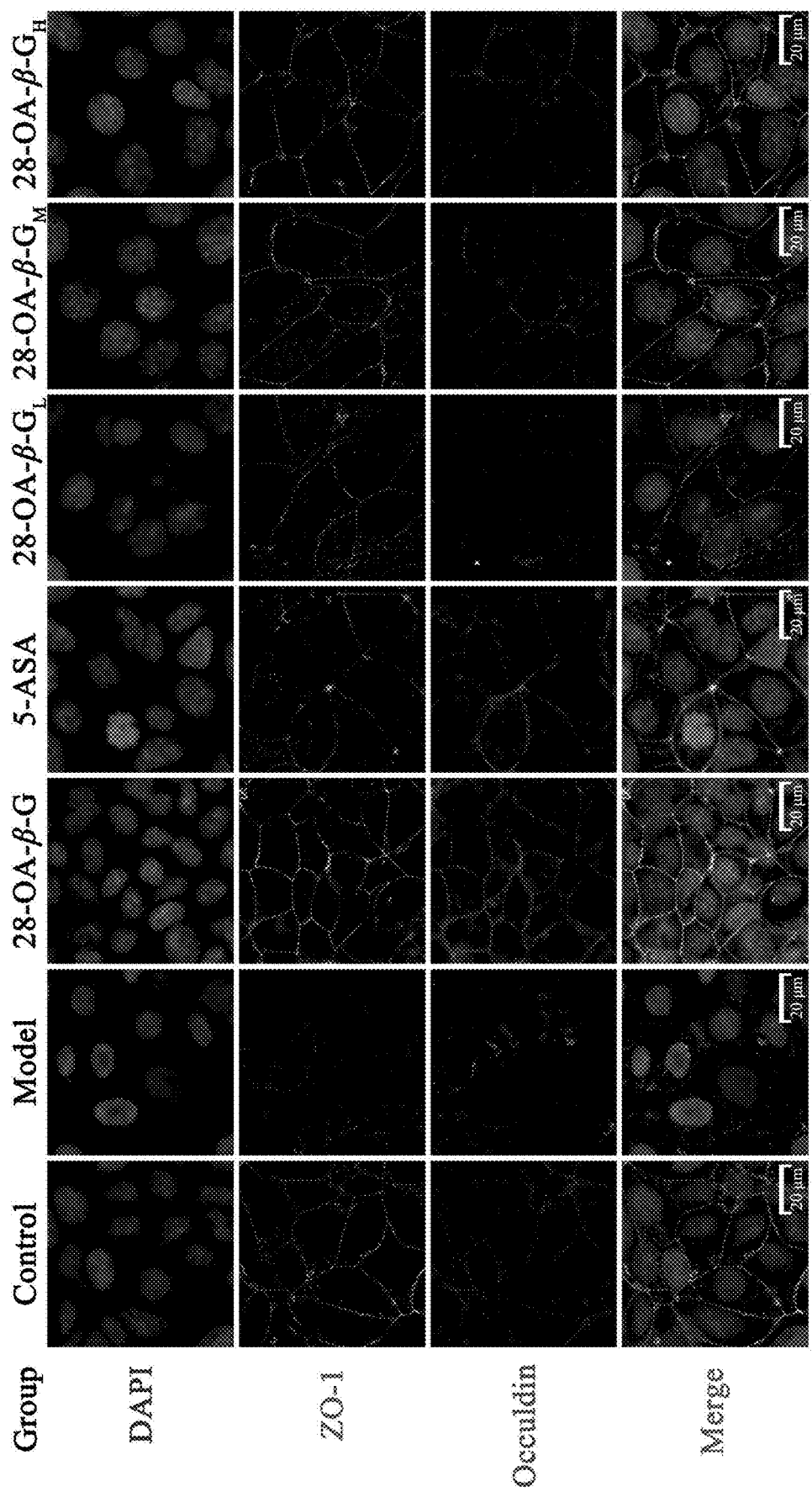
FIG. 5 shows immunofluorescence images of cells in the respective groups in Example 1, including typical immunofluorescence results of ZO-1 and Occludin.
Figure 6:
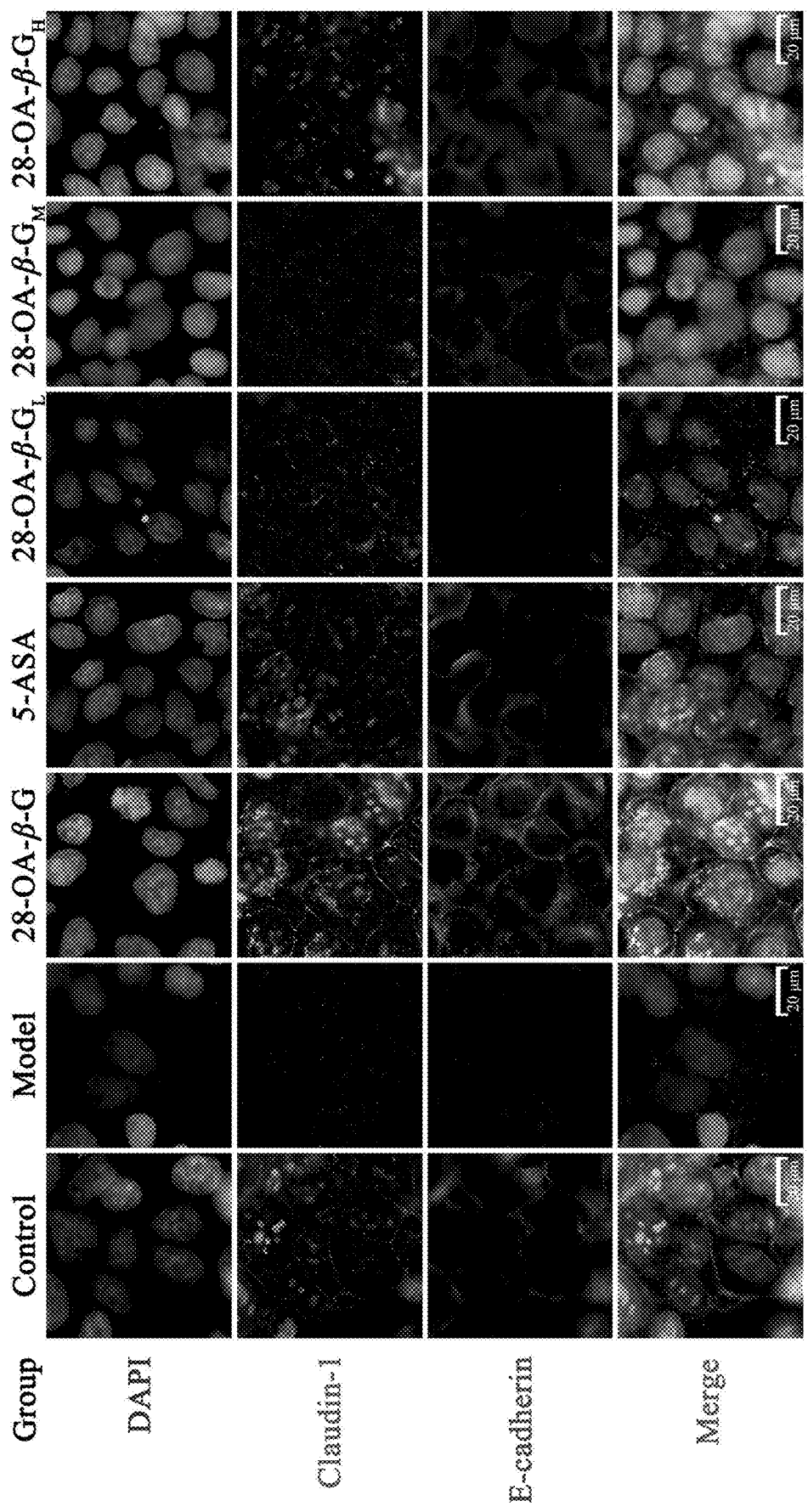
FIG. 6 shows immunofluorescence images of cells in the respective groups in Example 1, including typical immunofluorescence results of Claudin-1 and E-cadherin.

Tight junction proteins: all tight junction-related proteins in the intestinal tract were expressed on the cell membrane, so the distribution of tight junction proteins on the membrane could be understood more intuitively by using immunofluorescence observations. The specific results were shown in FIGS. 5 and 6, where ZO-1, Occludin, Claudin-1, and E-cadherin were all expressed on the cell membrane. In normal Caco-2 cells, various tight junction proteins were distributed successively on the membrane with the strongest fluorescence intensity. In normal cells, the expression of the four tight junction proteins was not affected by the administration of 28-OA-β-G alone. 1 μg/ml of LPS could not inhibit the survival of Caco-2 cells, but could cause a decrease in the expression of four tight junction proteins and lead to disorderly distribution and even disappearance of these proteins on the cell membrane. 28-OA-β-G intervention could alleviate the damage of LPS to the intestinal barrier of the Caco-2 cells. As the dose of 28-OA-β-G increased, the four tight junction proteins regained their normal distribution on the cell membrane and also increase the expression.

Example 2 In-Vivo Experiments of Oleanolic Acid-28-O-β-D-Glucopyranoside Against Ulcerative Colitis 1. Experimental Reagents Main experimental reagents were shown in Table 2.

TABLE 2

Main experimental reagents

| Name | Manufacturer |
| --- | --- |
| Dextran sulfate sodium (M.W.: 40000 Da), 2.5% glutaraldehyde fixative solution | Shanghai Macklin Biochemical Technology Co., Ltd. |
| Fluorescein iso-thiocyanate-dextran 4 kD (FD4) | American Sigma |
| 4% paraformaldehyde/universal tissue fixative solution | Beijing Lanjie Ke Technology Co., Ltd. |
| Hematoxylin-eosin stain | Guangzhou WEXIS Biotechnology Co., Ltd. |
| Phosphate buffered saline (PBS), | Wuhan Servicebio Technology Co., Ltd. |
| Mouse IL-6, iNOS, TNF-α, MPO, SOD, and MDA ELISA kits | Hangzhou Multisciences (Lianke) Biotech, Co., Ltd. |

2. Animal Grouping

SPF-grade BALB/c male mice (weighting 22-24 g) were purchased from Changchun Yisi Laboratory Animal Technology Co., Ltd. After 1 week of adaptive feeding, the mice were randomly divided into 6 groups (n=10), including: a control group, a model group, a positive drug group (5-ASA, 100 mg/kg), an oleanolic acid-28-O-β-D-glucopyranoside low-dose group (28-OA-β-$G_L$, 5 mg/kg), an oleanolic acid-28-O-β-D-glucopyranoside medium-dose group (28-OA-β-$G_M$, 10 mg/kg), and an oleanolic acid-28-O-β-D-glucopyranoside high-dose group (28-OA-β-$G_H$, 20 mg/kg).

3. Animal Modeling and Administration

The control group was administrated with distilled water, while the other groups were freely allowed to drink a 3.5% dextran sulfate sodium (M.W.: 40,000 Da, DSS) solution for 7 days to induce a UC model. From the Day 4 to Day 10 of modeling, the mice in the control group and the model group were administrated with distilled water by gavage, while the mice in other groups were administrated with a 5-ASA or 28-OA-β-G solution by gavage, respectively. The gavage was performed once a day. The administration volume was 10 ml/kg. After fasting for 12 hours on the Day 10, whole blood was collected from all mice by using an eyeball blood collection method, the mice were killed by cervical dislocation, and colon tissues and spleen tissues were collected.

4. Experimental Detection and Result Analysis

Body weight and disease activity index scores: during the experiment, all mice were weighed every day, and the general behavior states of the mice were observed; the weight changes, stool states and hematochezia degrees of the mice were recorded every day, and scored according to the criteria shown in Table 3; and an average disease activity index (DAI) score of the mice in each group per day was calculated according to the formula: DAI=(weight loss score+stool state score+hematochezia degree score)/3.

TABLE 3

DAI scoring criteria

| Scores | Weight loss percentage | Stool viscosity | Hematochezia degree |
| --- | --- | --- | --- |
| 0 | 0 | Normal | No |
| 1 | 1-5 | — | — |
| 2 | 5-10 | Loose | Mild hematochezia |
| 3 | 10-15 | — | — |
| 4 | >15 | Diarrhoea | Severe hematochezia |

Figure 7:
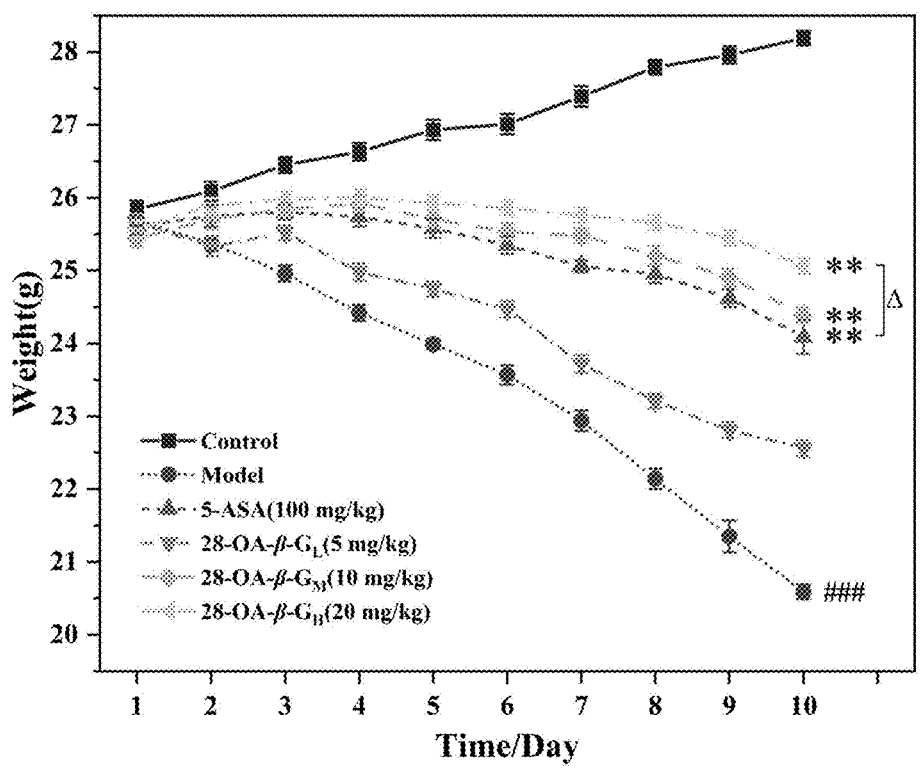
FIG. 7 shows changes in the weight of mice in the respective groups.

Body weight: the results were shown in FIG. 7. Throughout the experiment, the mice in the control group behaved and ate normally, and their weights increased; the mice in the model group showed a gradual decrease in appetite and weight loss as the modeling time increased; after intervention with 5-ASA and 28-OA-β-G, the weight loss rate of the mice in each administration group was significantly reduced; and the weights of the mice in each administration group were greater than those of the model group on the Day 10. The weight changes in the 28-OA-β-$G_H$ group tended towards the control group, and the weight changes in the 28-OA-β-G administration group were positively correlated with the increase in dose.

Figure 8:
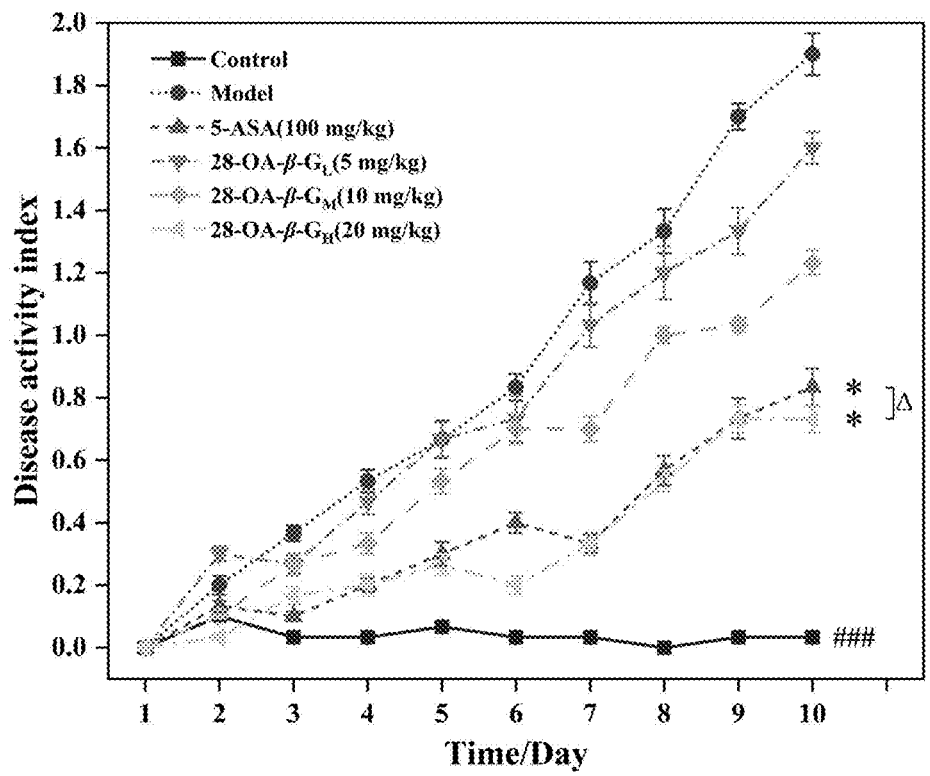
FIG. 8 shows the effects of oleanolic acid-28-O-β-D-glucopyranoside on colon disease activity indexes of model mice.

DAI score: the results were shown in FIG. 8. During the experiment, the mice in the control group had dry stool, but no anal bleeding, and the DAI score was basically unchanged; the mice in the model group gradually developed to watery stool and blood stool as the DSS-induced time increased, and the DAI score also increased as the modeling time increased; from Day 5 of the experiment, it was evident that the growth rate of DAI scores of the mice in each administration group was significantly slower than that in the model group; and on Day 10 of the experiment, the DAI score in the 28-OA-β-$G_H$ group was significantly lower than that in the model group, and had no significant difference compared to the 5-ASA group.

Figure 9:
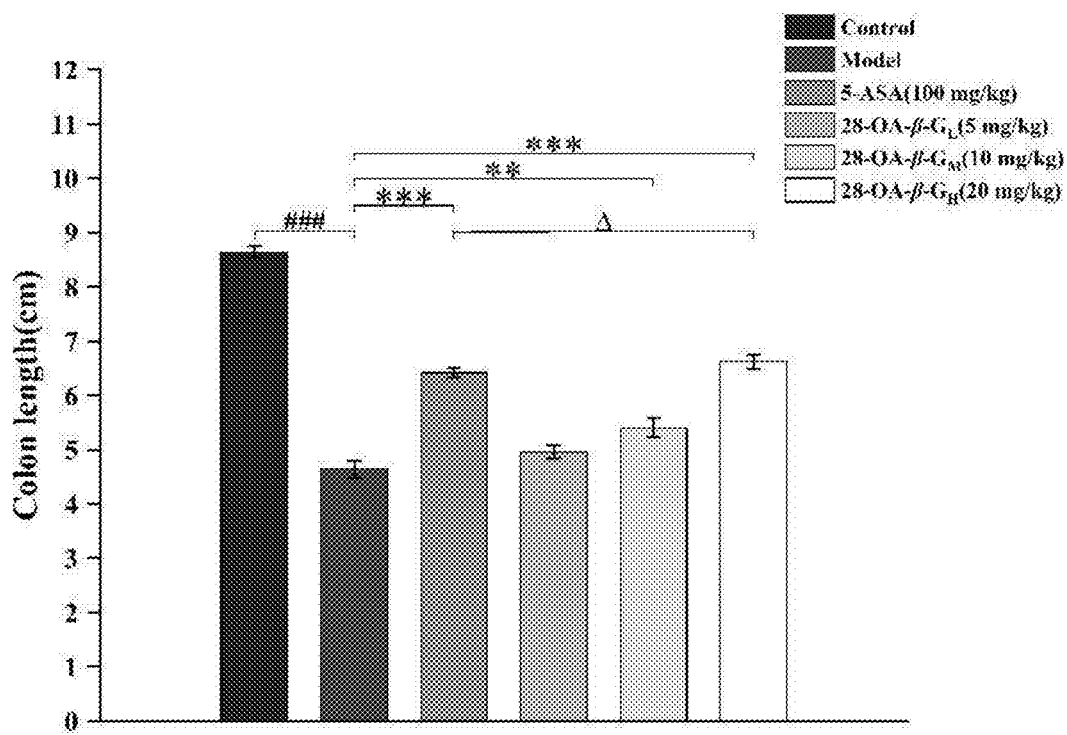
FIG. 9 shows the effects of oleanolic acid-28-O-β-D-glucopyranoside on colon lengths of model mice.

Colon length: the results were shown in FIG. 9. The colon length of the model group was significantly shortened compared with the control group, indicating that the colon tissues of the mice were damaged. After oral administration of 28-OA-β-G, the degree of colon damage was effectively alleviated.

Figure 10:
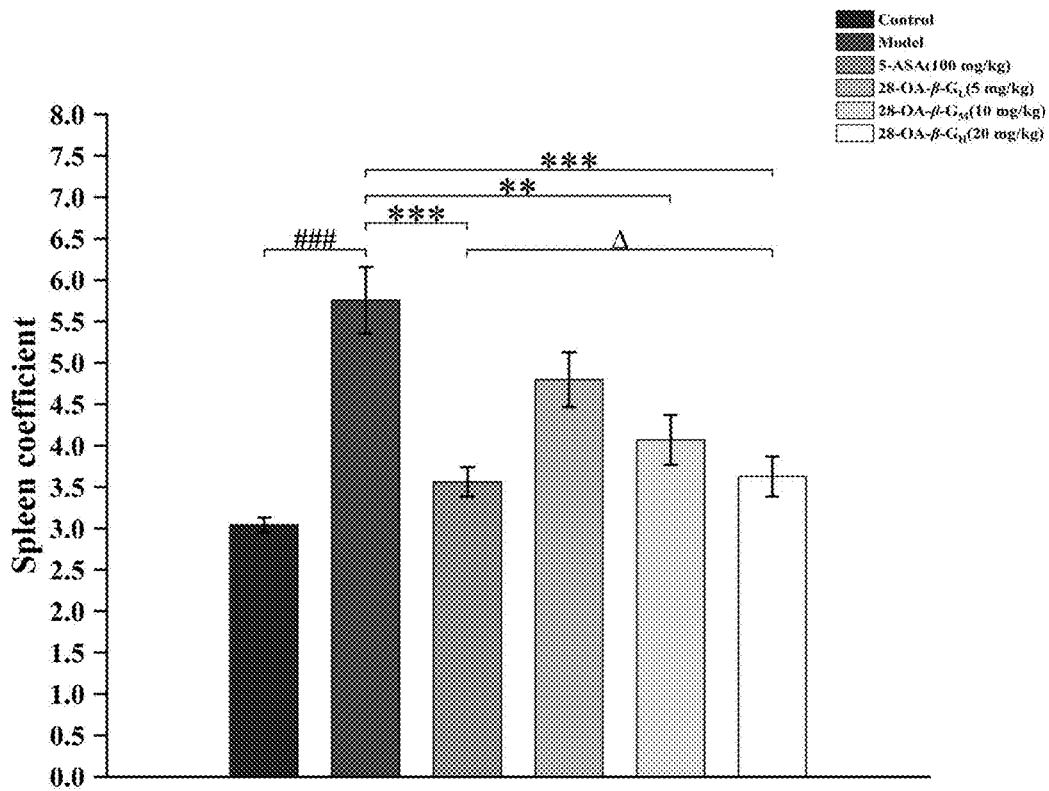
FIG. 10 shows the effects of oleanolic acid-28-O-β-D-glucopyranoside on colon spleen coefficients of model mice.

Spleen coefficient: the spleen tissues were dissected and accurately weighed, and the spleen coefficient was calculated using the formula: spleen coefficient=spleen mass (mg)/mouse weight (g), as shown in FIG. 10. The spleen coefficient also reflected the degree of inflammatory response within the body. The results showed that the spleen coefficient of the mice in the model group was significantly higher than that in the control group, indicating that inflammatory response had occurred in the mice; compared with the model group, the spleen coefficients of the mice in the positive drug group, the 28-OA-β-G high-dose group and the 28-OA-β-G medium-dose group were significantly reduced, and the spleen coefficient in the 28-OA-β-G high-dose group was similar to that in the positive drug 5-ASA group without significant difference ($p>0.05$).

From the measurement results of colon length and spleen coefficient, it was evident that the oleanolic acid-28-O-β-D-glucopyranoside could alleviate the colon damage and inflammatory response of the mice in the UC model.

Figure 11:
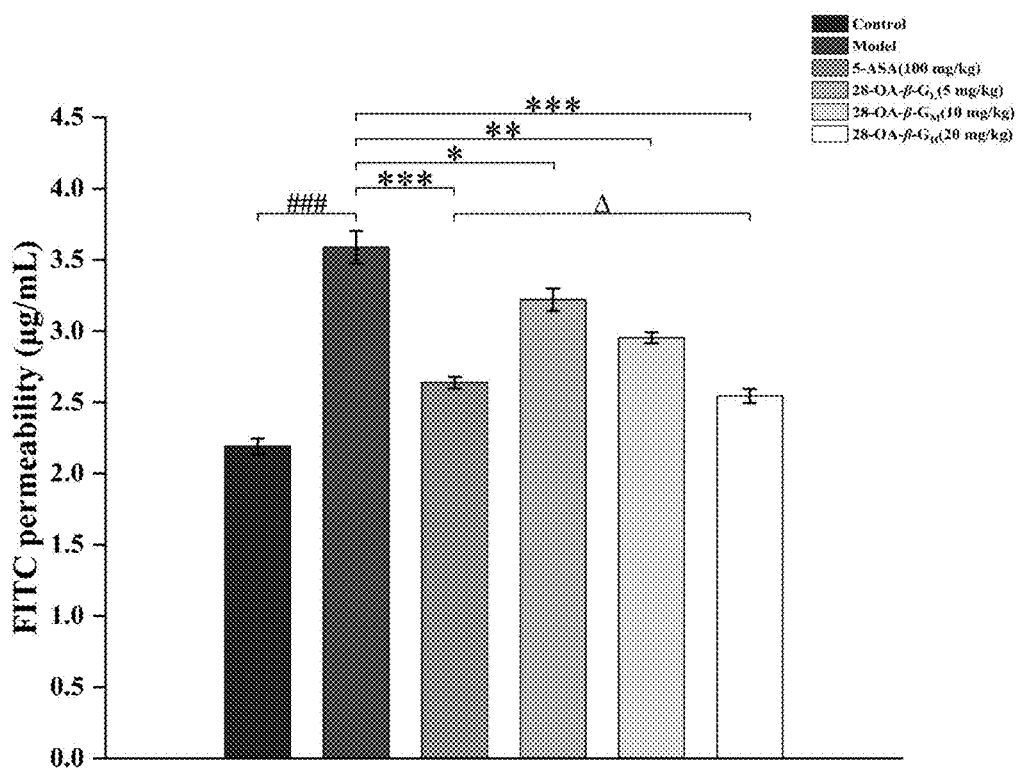
FIG. 11 shows the effects of oleanolic acid-28-O-β-D-glucopyranoside on colon FITC-dextran permeability of model mice.

FD4 permeability analysis: all mice were administrated with 20 mg/kg FD4 normal saline solution by gavage 30 minutes before sacrifice, whole blood was collected by the eye blood collection method on a sterile ultra-clean table, and the upper serum was taken after centrifugation, and then aspirated into a black 96-well microplate. The fluorescence intensity was detected using a microplate reader at an excitation wavelength of 492 nm and an emission wavelength of 520 nm. The results were shown in FIG. 11. In the model group, due to the impaired intestinal barrier function, fluorescein overflowed and flowed into the blood. However, the serum FD4 concentration was significantly reduced after 28-OA-β-G intervention, suggesting that 28-OA-β-G could reduce the FD4 permeability and improve the intestinal barrier function of the UC mice.

Figure 12:
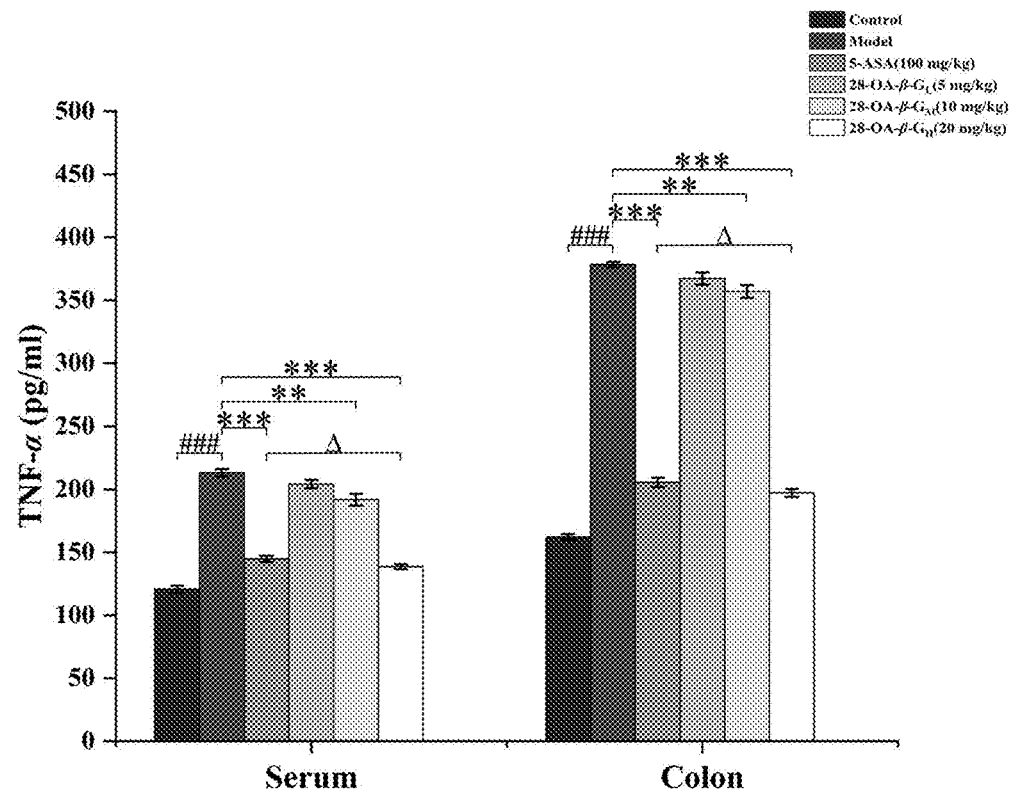
FIG. 12 shows the effects of oleanolic acid-28-O-β-D-glucopyranoside on TNF-α levels of model mice, wherein Serum is the serum, and Colon is the colon.
Figure 13:
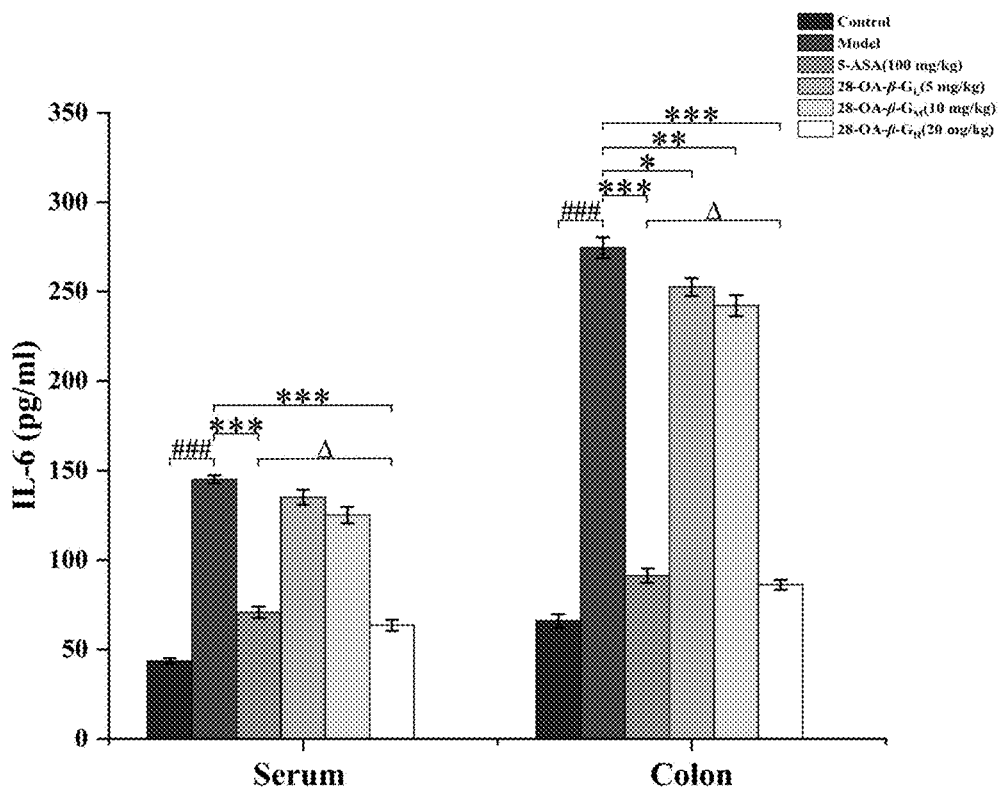
FIG. 13 shows the effects of oleanolic acid-28-O-β-D-glucopyranoside on IL-6 levels of model mice, wherein Serum is the serum, and Colon is the colon.
Figure 14:
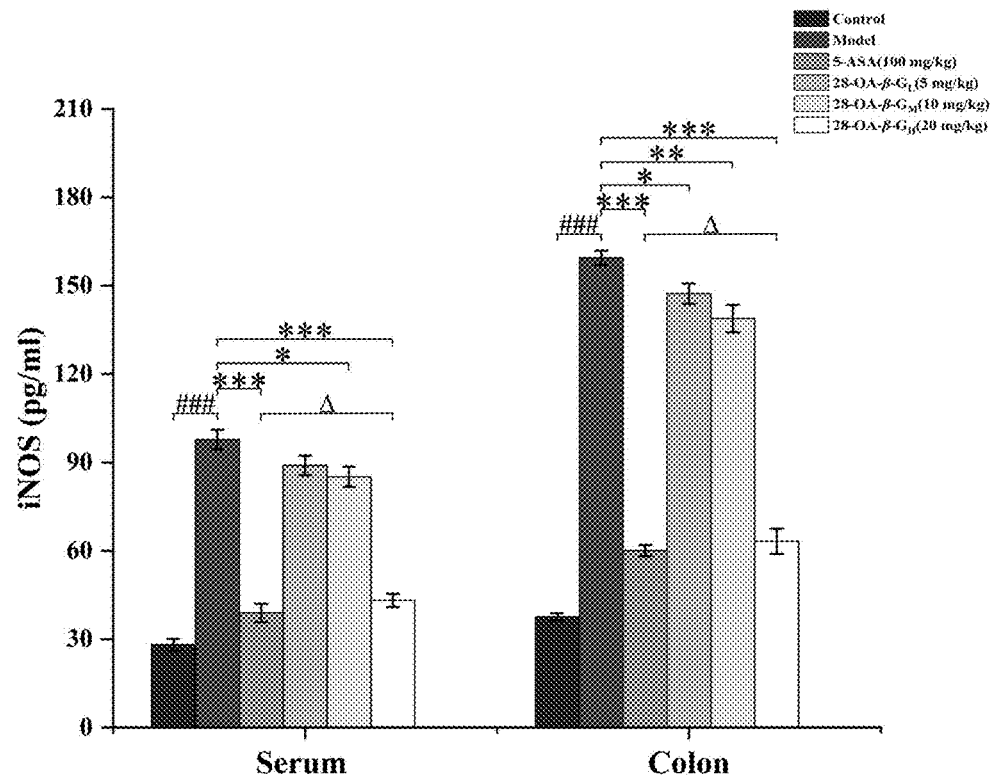
FIG. 14 shows the effects of oleanolic acid-28-O-β-D-glucopyranoside on iNOS levels of model mice, wherein Serum is the serum, and Colon is the colon.
Figure 15:
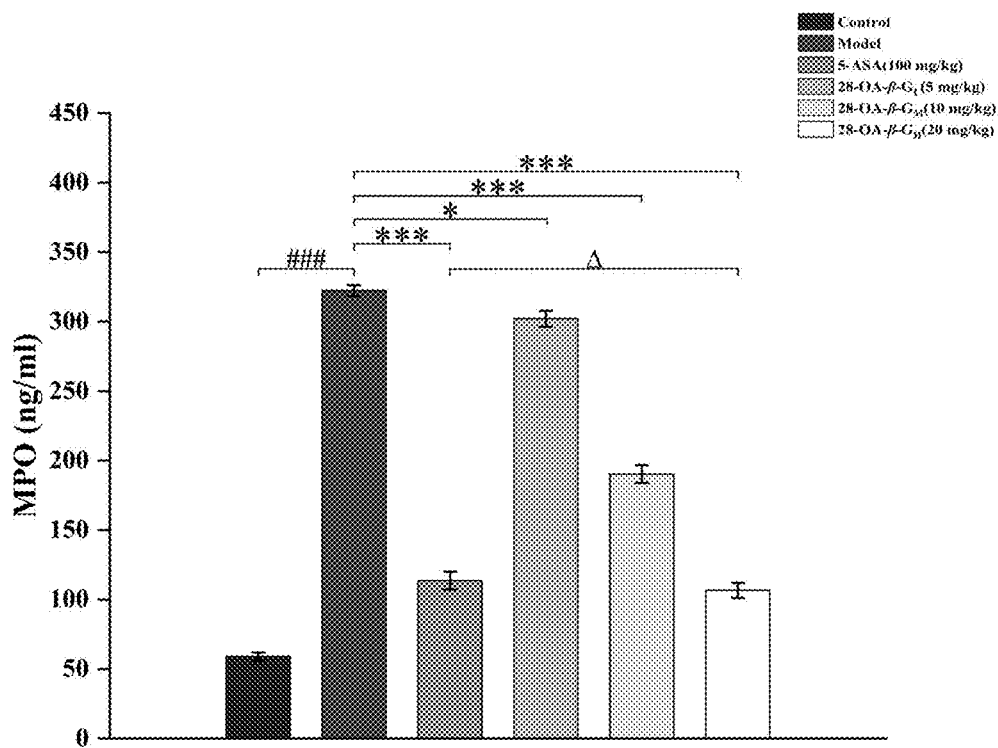
FIG. 15 shows the effects of oleanolic acid-28-O-β-D-glucopyranoside on colon MPO levels of model mice, wherein Serum is the serum, and Colon is the colon.
Figure 16:
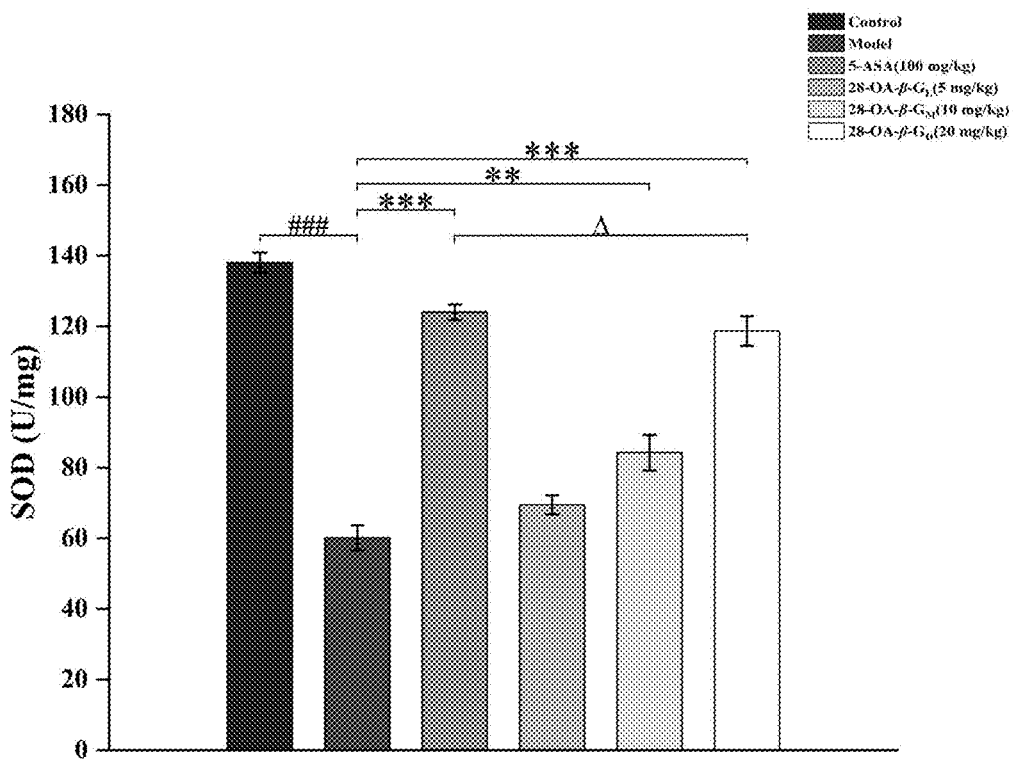
FIG. 16 shows the effects of oleanolic acid-28-O-β-D-glucopyranoside on colon SOD levels of model mice, wherein Serum is the serum, and Colon is the colon.
Figure 17:
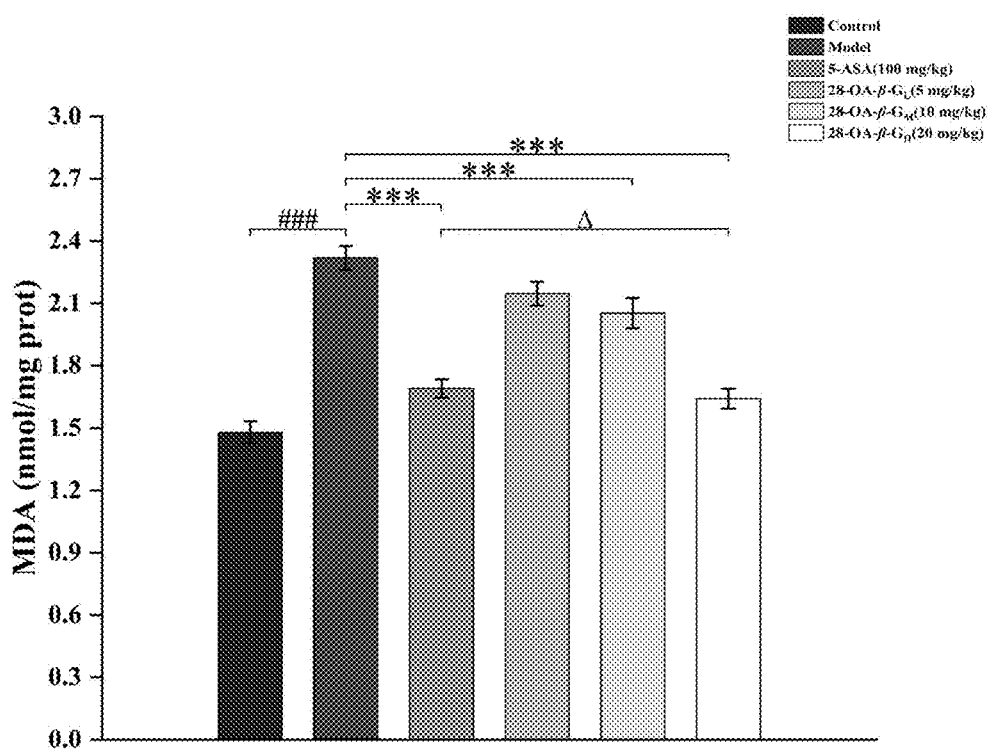
FIG. 17 shows the effects of oleanolic acid-28-O-β-D-glucopyranoside on colon MDA levels of model mice, wherein Serum is the serum, and Colon is the colon.

Content determination of inflammatory factor and oxidative stress indicators: serum and colon tissue samples were collected, and the contents of TNF-α, IL-6, and iNOS in the serum and colon were determined using an ELISA kit, while the levels of MPO, SOD, and MDA in the colon were detected. The determination results of TNF-α, IL-6, and iNOS were shown in FIGS. 12, 13, and 14, respectively. Compared with the control group, the levels of TNF-α, IL-6, and iNOS in the serum and colon in the model group significantly increased. After the administration of 5-ASA and 28-OA-β-G by gavage, the levels of these factors significantly decreased. It was worth noting that high-dose 28-OA-β-G showed similar pharmacological effects to the positive drug 5-ASA ($p>0.05$). The results showed that 28-OA-β-G could dose-dependently reduce the levels of TNF-α, IL-6 and iNOS in ulcerative colitis mice. The determination results of MPO, SOD, and MDA were shown in FIGS. 15, 16, and 17. In the model group, the levels of MDA and MPO in the colon were significantly higher than those in the control group. After drug intervention, the levels of these indicators were suppressed to varying degrees. The trend of SOD was opposite to that of other indicators. From the above results, it was evident that 28-OA-β-G could dose-dependently reduce the levels of TNF-α, iNOS, IL-6, MDA and MPO in UC model mice, and the SOD level increased.

Figure 18:
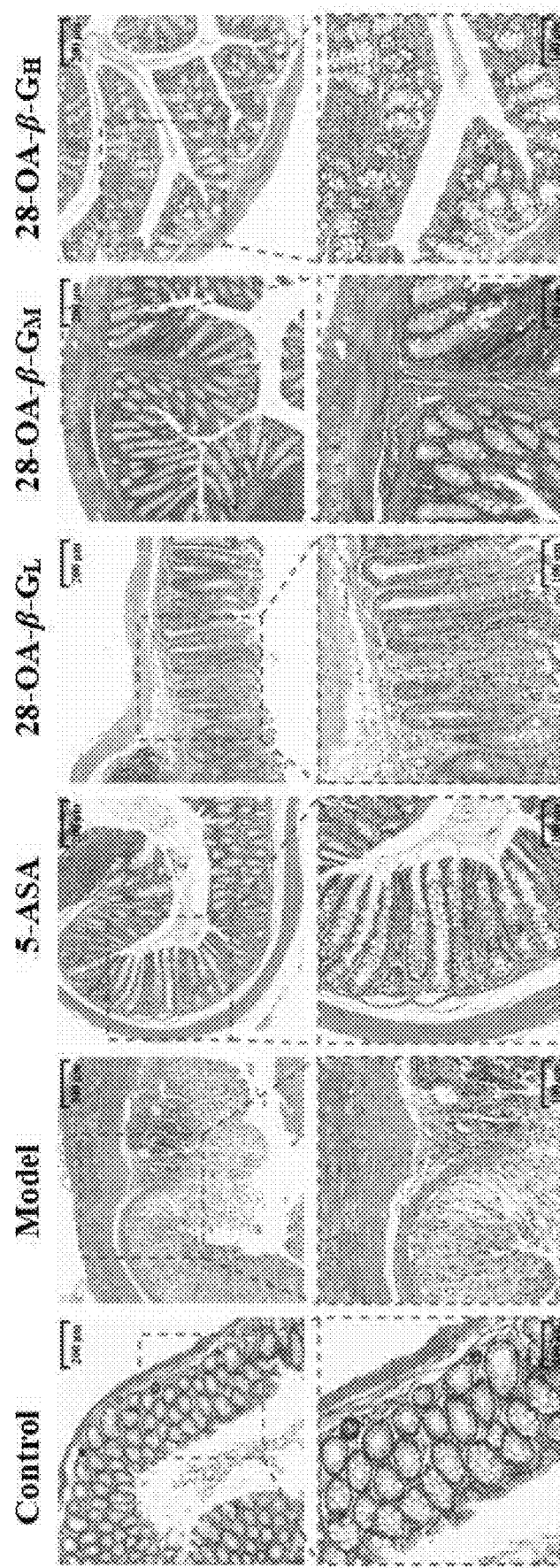
FIG. 18 shows H&E staining images of colon tissues of mice in the respective groups.

Histopathological examination of mouse colon tissues: the mouse colon tissues were fixed with a 4% paraformaldehyde/general tissue fixative solution, then embedded in paraffin, sectioned, dewaxed, hydrated, stained with hematoxylin and eosin (H&E), differentiated, clarified, and mounted on slides, and then observed and photographed under a light microscope. The results were shown in FIG. 18. In the control group, normal and complete colon structure and mucosal epithelium were observed. However, in the model group, severe damage to the colonic mucosa was observed, with edema in the submucosal area, absence of goblet cells, infiltration of inflammatory cells, and absence of crypts. Compared with the model group, the symptoms of the colon tissues in the respective administration groups were alleviated to varying degrees, with a reduction in inflammatory cell infiltration, recovery of epithelial damage, and relative integrity of the colon tissues.

Figure 19:
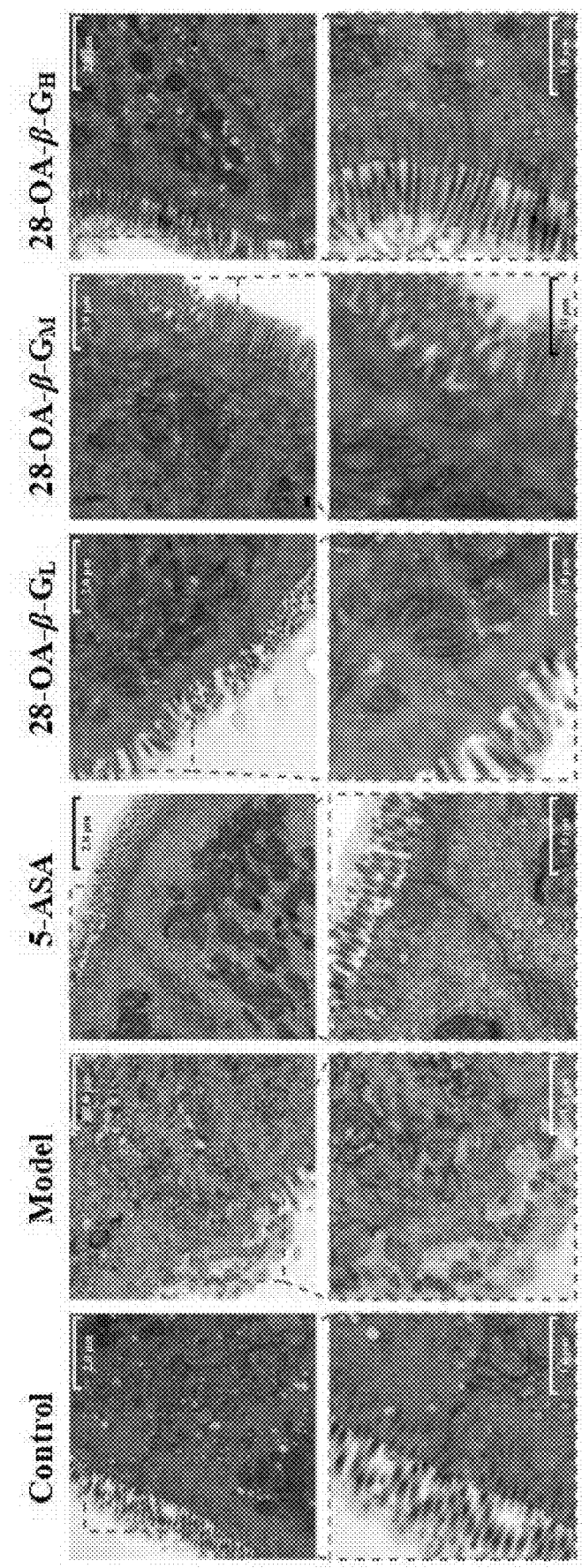
FIG. 19 shows transmission electron microscopy images of colon tissues of the mice in the respective groups.

Transmission electron microscope observation for mouse colon tissues: the mouse colon tissues were fixed with a 2.5% glutaraldehyde solution, then post-fixed, dehydrated, embedded in resin, sectioned, stained with uranyl acetate and lead citrate, and then observed and photographed under a transmission electron microscope. The results were shown in FIG. 19. The microvilli on the brush borders of colonic mucosa cells of the mice in the control group were neatly arranged, and the microvilli were slender and compact. The morphology of the tight junctions among the cells was normal, and the organelles were not degenerated, without vacuole changes in the cytoplasm. In the model group, the microvilli of the mice were sparse, shortened or even disappeared, the intercellular junctions were no longer tight, the cytoplasm was uneven, and the mitochondria showed vacuolar degeneration. Compared with the model group, the 28-OA-β-$G_H$ group restored the integrity of intestinal mucosa cells, the microvilli were neatly arranged, the organelles were not degenerated, and the ultrastructure of epithelial cells of colonic mucosa of the mice were retained.

The results showed that the oleanolic acid-28-O-β-D-glucopyranoside had significant anti-ulcerative-colitis activity which was not statistically different from that of the positive control group of 5-ASA, the first-line treatment drug, indicating that they had equivalent efficacy.

The detailed illustrations listed above are merely for specifically illustrating the feasible examples of the present invention, but not intended to limit the patent scope of the present invention. Any equivalent embodiments or variations made without departing from the present invention shall fall within the scope of the technical solutions of the present invention.

What is claimed is:

1. A method for treating ulcerative-colitis, comprising administering a therapeutically effective amount of oleanolic acid-28-O-β-D-glucopyranoside to a subject in need thereof, wherein the method reduces myeloperoxidase (MPO) and/or malondialdehyde (MDA) level in the colon of the subject.

2. The method according to claim 1, wherein the method reduces tumor necrosis factor-alpha (TNF-α) level in the serum and/or the colon of the subject.

3. The method according to claim 1, wherein the method reduces interleukin-6 (IL-6) level in the serum and/or the colon of the subject.

4. The method according to claim 1, wherein the method reduces inducible nitric oxide synthase (iNOS) level in the serum and/or the colon of the subject.

5. The method according to claim 1, wherein the method increases superoxide dismutase (SOD) level in the colon of the subject.

6. The method according to claim 1, wherein the method reduces intestinal permeability.

7. The method according to claim 1, wherein the method reduces colon disease activity index and/or spleen coefficient of the subject.

\* \* \* \* \*